United States Patent [19]
Yamasaki et al.

[11] Patent Number: 5,917,859
[45] Date of Patent: Jun. 29, 1999

[54] METHOD AND APPARATUS FOR IMPLEMENTING A VITERBI DETECTOR FOR PRML CHANNELS

[75] Inventors: Richard G. Yamasaki, Torrance; Tzu-Wang Pan, Irvine, both of Calif.

[73] Assignee: Silicon Systems, Inc., Tustin, Calif.

[21] Appl. No.: 08/893,863

[22] Filed: Jul. 11, 1997

Related U.S. Application Data

[63] Continuation of application No. 08/217,435, Mar. 24, 1994.
[51] Int. Cl.$^6$ .............................. H04L 27/28; H04L 5/12
[52] U.S. Cl. ............................ 375/262; 375/341; 371/43
[58] Field of Search .................................... 375/262, 263, 375/290, 286, 340, 341, 346, 348; 360/26, 51; 371/43; 364/602

[56] References Cited

U.S. PATENT DOCUMENTS

| | | |
|---|---|---|
| 3,508,158 | 4/1970 | Marchese . |
| 4,087,787 | 5/1978 | Acampora . |
| 4,644,564 | 2/1987 | Dolivo et al. . |
| 4,710,746 | 12/1987 | Shimoda et al. . |
| 4,755,960 | 7/1988 | Batson et al. . |
| 4,991,134 | 2/1991 | Ivsin . |
| 5,115,404 | 5/1992 | Lo et al. . |
| 5,321,559 | 6/1994 | Nguyen ..................................... 360/46 |
| 5,341,249 | 8/1994 | Abbott et al. ............................. 360/46 |
| 5,341,387 | 8/1994 | Nguyen .................................... 375/340 |
| 5,384,560 | 1/1995 | Yamasaki . |
| 5,430,768 | 7/1995 | Minuhin et al. ......................... 375/340 |

OTHER PUBLICATIONS

Anthony S. Acampora et al., "Analog Viterbi Decoding for High Speed Digital Satellite Channels," IEEE Transactions on Communications, vol. COM–26, No. 10, Oct. 1978, pp. 1463–1470.

K. Chopra et al., "A Maximum Likelihood Peak Detecting Channel," 1991 International Magnetics Conference, Jun. 1991.

M. J. Ferguson, "Optimal Reception for Binary Partial Response Channels," The Bell System Technical Journal, vol. 15, No. 2, Feb. 1972, pp. 493–505.

G. David Forney, Jr., "The Viterbi Algorithm," Proceedings of the IEEE, vol. 61, No. 3, Mar. 1973, pp. 268–278.

H. Kobayashi, "Application of Probabilistic Decoding to Digital Magnetic Recording Systems," IBM Journal of Research and Development, vol. 15, No. 1, Jan. 1971, pp. 64–74.

Thomas W. Matthews et al., "An Analog CMOS Viterbi Detector for Digital Magnetic Recording," ISSCC Digest of Technical Papers, Feb. 1993, pp. 214–215, 291.

(List continued on next page.)

*Primary Examiner*—Chi H. Pham
*Assistant Examiner*—Bryan Webster
*Attorney, Agent, or Firm*—W. Daniel Swayze, Jr.; Wade James Brady, III; Richard L. Donaldson

[57] ABSTRACT

An improved Viterbi detector for use in a partial-response maximum-likelihood (PRML) channel. The present invention reduces the amount of hardware necessary in the conventional digital implementation, as well as increasing the speed of the system, by utilizing analog circuits. Whereas prior art analog implementations use more complex hardware and less efficient algorithms, the present invention utilizes easily realizable circuitry to perform a more efficient algorithm. A sampled data Viterbi detector compares a sampled analog input signal with two threshold signals. The binary outputs of the comparing means are then provided to a survival sequence register, as well as being used to formulate new threshold signals for the subsequent input sample. The hardware implements Ferguson's method for calculating sequence metrics by representing the accumulated metric difference as two threshold signals. Probability based decisions are then performed in analog comparators. Because Ferguson's method only requires formulation of the difference between metrics rather than formulation of the true metrics themselves, the successive threshold signals that represent this difference can be generated using multi-input track and hold circuits and a voltage summing means.

31 Claims, 6 Drawing Sheets

OTHER PUBLICATIONS

Richard R, Spencer, "A Parallel Architecture for High-Speed Analog Viterbi Detectors," Proceedings of the 33rd Midwest Symposium on Circuits and Systems, vol. 2, 1991, pp. 1030–1033.

Richard R. Spencer, "Simulated Performance of Analog Viterbi Detectors," IEEE Journal on Selected Areas in Communications, vol. 10, No. 1, Jan. 1992, pp. 277–288.

Roger R. Wood et al., "Viterbi Detection of Class IV Partial Response on a Magnetic Recording Channel," IEEE Transactions on Communications, vol. COM–34, No. 5, May 1986, pp. 454–461.

Roger Wood, "Magnetic Megabits," IEEE Spectrum, May 1990, pp. 32–38.

METHOD AND APPARATUS FOR IMPLEMENTING A VITERBI DETECTOR FOR PRML CHANNELS

This application is a continuation, of application Ser. No. 08/217,435 filed on March 1994.

BACKGROUND OF THE INVENTION

1. Field of the Invention

The present invention relates to the field of signal processing, and in particular, to signal processing in a partial-response (PRML) read channel.

2. Background Art

Communication of voice and data signals is often accomplished by converting analog signals to digital signals. These digital signals are then transmitted from a transmitting device to a receiving device, converted back to analog, if necessary, and communicated to a user. This digital transmission is often performed through analog channels. Digital information is transmitted in the form of a "symbol" representing a digital value. In some cases, adjacent symbols can overlap, resulting in a phenomenon known as intersymbol interference. This interference can corrupt a digital transmission, leading to errors in the receipt of the digital information.

In a magnetic recording channel, a method for decoding the binary symbol sequence that is outputted from the channel in its corrupted form is required. Maximum-likelihood sequence estimation (MLSE) decoding has been employed in the past as an effective tool in pulse detectors for receiving and decoding digital transmissions that suffer from intersymbol interference.

Using partial response signaling allows a better handling of intersymbol interference and allows a more efficient utilization of the bandwidth of a given channel. In partial response systems, a controlled amount of intersymbol interference can be allowed. The partial response system is described by the polynomials 1+D, 1-D and $(1-D^2)$, also called duobinary, dicode, and class-IV, respectively.

Class IV partial response waveforms are formed by the subtraction of binary waveforms two bit intervals apart. This process boosts midband frequencies making the system more immune to noise and distortion at both high and low frequencies. This is especially useful in a magnetic recording channel where, using a conventional inductive head, there is little signal at low frequencies and spacing losses can cause large attenuation at high frequencies.

Because class IV partial response signaling for digital detection is especially suited for the magnetic recording channel, sampled amplitude detection can be applied for magnetic recording. To minimize the propagation of data errors, the signal is turned into a sequence of binary numbers. Procedures for determining the maximum likelihood sequence in the presence of noise can then be applied. With sequence detection, sequences of bits are detected and processed to minimize error.

Maximum likelihood sequence estimation, in particular, the Viterbi algorithm, is used in improving the detection of symbol (pulse) sequences in the presence of noise and intersymbol interference. MLSE is described by G.D. Forney in "The Viterbi Algorithm," Proceedings of the IEEE, Vol. 61, No. 3, March, 1973, pp. 268–278, and by R. W. Wood, etc., in "Viterbi Detection of Class IV Partial Response on a Magnetic Recording Channel," IEEE transactions on communications, Vol. COM-34, No. 5, May, 1986, pp. 454–461.

One of the earliest references (Kobayashi, "Application of Probabilistic Decoding to Digital Magnetic Recording Systems," IBM journal of Research and Development, Vol. 15, No. 1, January 1971, pp. 64–74) to the use of the Viterbi algorithm on the intersymbol interference problem was related to Class IV Partial Response on the Magnetic Recording Channel. In essence, the algorithm provides an iterative method of determining the "best" route along the branches of a trellis. If, for each branch, a "metric" is calculated which corresponds to the logarithm of the probability of that branch, then the Viterbi algorithm can be used to determine the path which accumulates the highest log probability, i.e., the maximum likelihood sequence. In essence, given a received sequence $(a_n)$ where n is an integer time index, choose from among all possible transmitted sequences $(b_n)$ the one which is most likely to cause $(a_n)$ to be received, i.e., choose $(b_n)$ to maximize $P((a_n)|(b_n))$.

With the Viterbi algorithm, data is not decoded as soon as it is received. Instead, a sequence of data, having a predetermined coding depth following the digit to be decoded, is first collected. Then, by computing the path metrics, a limited number of possible messages are selected, each extending throughout the decoding depth far beyond the digit presently to be decoded, with one such survivor sequence ending in each of the data states. The correlation between each survivor sequence and the data actually received is computed for the entire decoding depth under consideration. The highest correlated of the survivor sequences is selected to be the sole survivor sequence. The earliest of the received digital digits within the decoding depth is then permanently decoded under the temporary assumption that the sole survivor sequence is the correct sequence.

Figure 6:
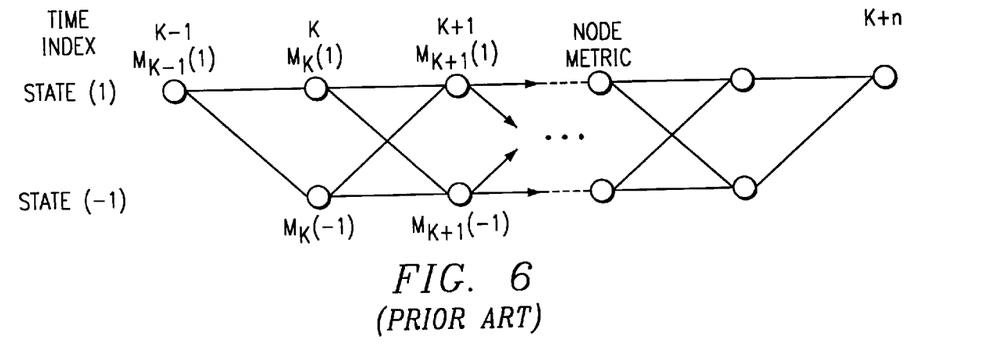
FIG. 6 is an illustration of a two-state trellis representation of the Viterbi algorithm.

The MLSE problem is similar to the problem of finding the shortest route through a certain graph. The Viterbi algorithm arises as a natural recursive solution. This algorithm is often associated with a state diagram which can be illustrated by a trellis as shown in FIG. 6. In the two-state trellis of FIG. 6, each node represents a distinct state at a given time, and each branch represents a transition to some new state at the next instant of time.

For the 2-state trellis shown in FIG. 6, the upper branches and nodes represent the (1) state path and the lower state branches and nodes represent the (-1) or (0) state path. The diagonal branches represent a path that changes state. The node metrics (the accumulated log likelihood) at time K are only a function of the node metrics at K-1 and the path metrics. They are given by:

$$M_K(-1) = \max[M_{K-1}(-1), M_{K-1}(1) - Y_K - V_T] \quad (1)$$

$$M_K(1) = \max[M_{K-1}(1), M_{K-1}(-1) + Y_K - V_T] \quad (2)$$

where $M_K(-1) = (-1)$ metric value at t=K $M_K(1) = (1)$ metric value at t=K $Y_K$ = signal amplitude at t=K $V_T$ = threshold amplitude for $Y_K$, the most likely value between a sequence pulse and no pulse.

$V_T$ is set to equal the most likely value between $Y_K$ and noise. $V_T$ could be set by the average peak values of $Y_K$ or by a predetermined or programmable value.

Thus, a change in state for equation (1) will occur if $M_{K-1}(1) - Y_K - V_T \geq M_{K-1}(-1)$, e.g., $M_K(-1) \neq M_{K-1}(-1)$. A change in state for equation (2) will occur if $M_{K-1}(-1) + Y_K - V_T \geq M_{K-1}(-1)$, e.g., $M_K(1) \neq M_{K-1}(1)$.

Partial response class IV waveforms can be considered as two independent interleaved dicode (1–D) sequences and each sequence can be decoded independently. In his paper entitled "Optimal Reception for Binary Partial Response Channels", in The Bell System Technical Journal, volume 51, number 2, pp. 493–505, published in February 1972, M. J. Ferguson proposes a simplified method for Viterbi detection for binary partial response channels (e.g. 1–D). Straightforward Viterbi detection needs to keep track of both probabilities going into the two states, and the ranges of the probabilities are not bounded. Ferguson's method only needs to keep track of the difference between the two probabilities and the value of the difference is well-bounded. Assume that $\alpha_K$ is the difference between the two probabilities in equations (1) and (2) at time k, $y_k$ is the received signal value, and VT (from Eq. 2 above)=1.

$$\Delta_{k+1} = \begin{cases} y_k + 1, & \text{if } \Delta_k - y_k > 1 \quad \text{("-" transition, "+" merge)} \\ \Delta_k, & \text{if } -1 < \Delta_k - y_k < 1 \quad \text{(no transition, no merge)} \\ y_k - 1, & \text{if } \Delta_k - y_k < -1 \quad \text{("+" transition, "-" merge)} \end{cases} \quad (3)$$

Two prior art examples of applying the Viterbi algorithm for decoding magnetic recording channel outputs are U.S. Pat. No. 4,644,564 by Dolivo et al. and U.S. Pat. No. 4,087,787 by Acampora. Dolivo et al. disclose a method that uses two survivor sequences and the difference metric between the two metrics is processed. In Dolivo et al., as each sample is received, the prior art patent recursively determines the new pair of survivor sequences and the new difference metric. Dolivo et al. is implemented in a digital format that suffers in terms of speed and requires more electronics to implement. Furthermore, resetting of the voltage signals does not occur automatically as is desired.

Although most of the Viterbi detectors built to date are implemented with digital circuits, it is always attractive to use analog implementation to avoid the speed, area, cost and power dissipation drawbacks inherent in digital circuit necessities such as a front end analog-to-digital converter.

Acampora employs a Viterbi decoder that comprises a tap delay line and sample-and-hold circuits to perform the path metric operations including storing and updating the path metrics. The path metrics of Acampora can increase without bound with time. To prevent metric overflow, one metric is arbitrarily set to zero. The original value of that metric is first subtracted from all other metrics to preserve the integrity of the difference between the path metrics. A simpler and less arbitrary implementation is desired. Furthermore, these tap delay lines would need to be implemented by variable delays.

As shown in "An Analog CMOS Viterbi Detector for Digital Magnetic Recording", Digest of Technical Papers IEEE International Solid-State Circuits Conference, pp. 213–215, published in February 1993, Matthews and Spencer have built an analog Viterbi detector based on the original Viterbi add-compare-select algorithm. Gains made by using an analog system instead of a digital system are offset by the complexity needed to implement the original Viterbi algorithm.

SUMMARY OF THE PRESENT INVENTION

The present invention provides an improved Viterbi detector for use in a partial-response maximum-likelihood (PRML) channel. The present invention reduces the amount of hardware necessary in the conventional digital implementation, as well as increasing the speed of the system, by utilizing analog circuits. Whereas prior art analog implementations use more complex hardware and less efficient algorithms, the present invention utilizes easily realizable circuitry to perform a more efficient algorithm.

In the present invention, a sampled data Viterbi detector compares a sampled analog input signal with two threshold signals. The binary outputs of the comparing means are then provided to a survival sequence register, as well as being used to formulate new threshold signals for the subsequent input sample. The hardware implements Ferguson's method for calculating sequence metrics by representing the accumulated metric difference as two threshold signals. Probability based decisions are then performed in analog comparators. Because Ferguson's method only requires formulation of the difference between metrics rather than formulation of the true metrics themselves, the successive threshold signals that represent this difference can be generated using multi-input track and hold circuits and a voltage summing means.

In the preferred embodiment of the invention, analog input is sampled with a standard track and hold circuit. This sampled signal is provided to two comparators, as well as the threshold updating means. The comparators determine where the sampled signal lies with respect to the two thresholds computed from the previous sample, ie. above the positive threshold, between the positive and negative thresholds or below the negative threshold. The binary outputs of the comparators are latched and then sent out on a subsequent phase to the survival sequence register. The positive threshold signal is created by sampling either the sampled input or the sampled input plus a voltage offset. The negative threshold is created by sampling either the sampled input or the sampled input minus the voltage offset. The previous detector output signals are used to select the appropriate threshold sampling value according to Ferguson's adaptation to the Viterbi algorithm. The present invention is able to overcome the disadvantages of the prior art by implementing a modified Viterbi algorithm using a simple analog solution.

DETAILED DESCRIPTION OF THE PRESENT INVENTION

A method and apparatus for implementing a Viterbi detector for use in a partial-response maximum-likelihood (PRML) channel is described. In the following description, numerous specific details, such as track and hold circuit components, are described in order to provide a more thorough description of the present invention. It will be apparent, however, to one skilled in the art, that the present invention may be practiced without these specific details. In other instances, well-known features have not been described in detail in order not to unnecessarily obscure the present invention.

The preferred embodiment of the present invention is employed as part of a read channel for data recovery in a magnetic storage system. It is suitable however for any channel in which partial-response methods are employed. The apparatus of the present invention performs Viterbi PRML detection without the cost, space and complexity of analog-to-digital converters, digital adders, digital comparators, digital multiplexers and multibit storage registers. Furthermore, the present invention implements a modified form of the Viterbi algorithm such that speed can be maximized and hardware can be minimized.

By rewriting the inequalities of equation (3), the following relation is obtained.

$$\Delta_{k+1} = \quad (4)$$

$$\{y_k + 1, \text{ if } y_k < \Delta_k - 1 \quad \text{("--" transition, "+" merge)}$$
$$\{\Delta_k, \quad \text{ if } \Delta_k - 1 < y_k < \Delta_k + 1 \quad \text{(no transition, no merge)}$$
$$\{y_k - 1, \text{ if } y_k > \Delta_k + 1 \quad \text{("+" transition, "--" merge)}$$

The present invention implements equation (4) above by considering the values $(\Delta_k-1)$ and $(\Delta_k+1)$ as two threshold values, $Vthn_k$ and $Vthp_k$, respectively. This leads to the algorithm:

If $Y_k<Vthn_k$ ("--" transition, "+" merge)
then $Vthp_{k+1}=y_k+2$ and $Vthn_{k+1}=y_k$
If $Vthn_k<y_k<Vthp_k$ (no transition, no merge)
then $Vthp_{k+1}=Vthp_k$ and $Vthn_{k+1}=Vthn_k$
If $y_k>Vthp_k$ ("+" transition, "--" merge)
then $Vthp_{k+1}=y_k$ and $Vthn_{k+1}=y_k-2$ When the input signal level lies between the two thresholds, nothing happens. Both thresholds will retain their original values. When the input signal is higher than Vthp, the input signal will replace the old Vthp value as the new threshold for the next clock period, and the new Vthn will just track the new Vthp with a distance of two volts (depending on scaling) between the thresholds. If the input signal is lower than Vthn, then the input signal level will replace the old Vthn value as the new Vthn for the next clock period, and the new Vthp will track the new Vthn. The comparison results are provided to a typical Viterbi survival sequence register to obtain the final merged decision.

Figure 7:
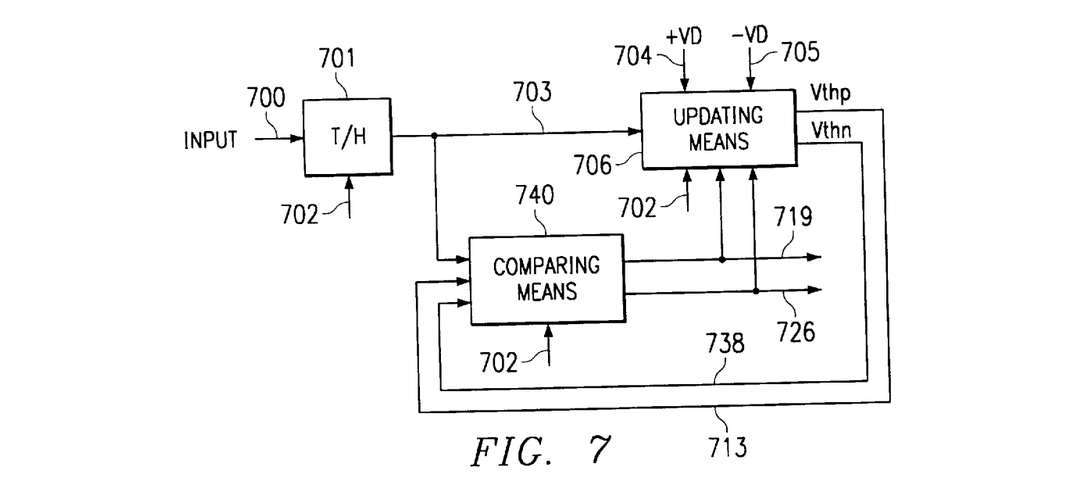
FIG. 7 is a block diagram of the present invention.

FIG. 7 shows a general block diagram of an apparatus for implementing the algorithm above. There are three basic blocks necessary to perform the operation: analog sampling means for generating $y_k$ (block 701), threshold updating means for selectably storing either $y_k$ or $y_k$ with an offset (-2 or +2, optimally) to implement $Vthn_k$ and $Vthp_k$ (block 706), and means for comparing $y_k$ with $Vthn_k$ and $Vthp_k$ (block 740).

Analog sampling means 701 receives analog input signal 700 and locks on the value when timing signal 702 is asserted. Sampling means 701 provides the sampled value as signal 703. Signal 703 is equivalent to $y_k$ in the algorithm above. Signal 703 is provided to comparing means 740 where it is compared with signals 713 and 738, the equivalents of $Vthp_k$ and $Vthn_k$. The results of the two comparisons are latched based upon timing signal 702 and then provided as output signals 719 and 726. Signals 719 and 726 indicate "+" merge and "--" merge results, respectively. If both signals are low, no merge is indicated. The merge indicator outputs 719 and 726 are provided to a typical Viterbi survival sequence register to obtain the final merged decision.

Signals 719 and 726 are provided to updating means 706, wherein they are gated with timing signal 702 and used to select the appropriate threshold values for the next sampling cycle as signals 713 and 738. The thresholds maintain their values if no merge is indicated. Updating means 706 are provided with +VD signal 704 and -VD signal 705 for combining with signal 703 to generate the offsets prescribed by the algorithm. VD can be considered as the difference between the threshold values Vthnk and Vthpk. The theoretically optimal value for VD is two. VD can be made controllable. This feature is useful for testing the detection margin of the system.

Figure 1:
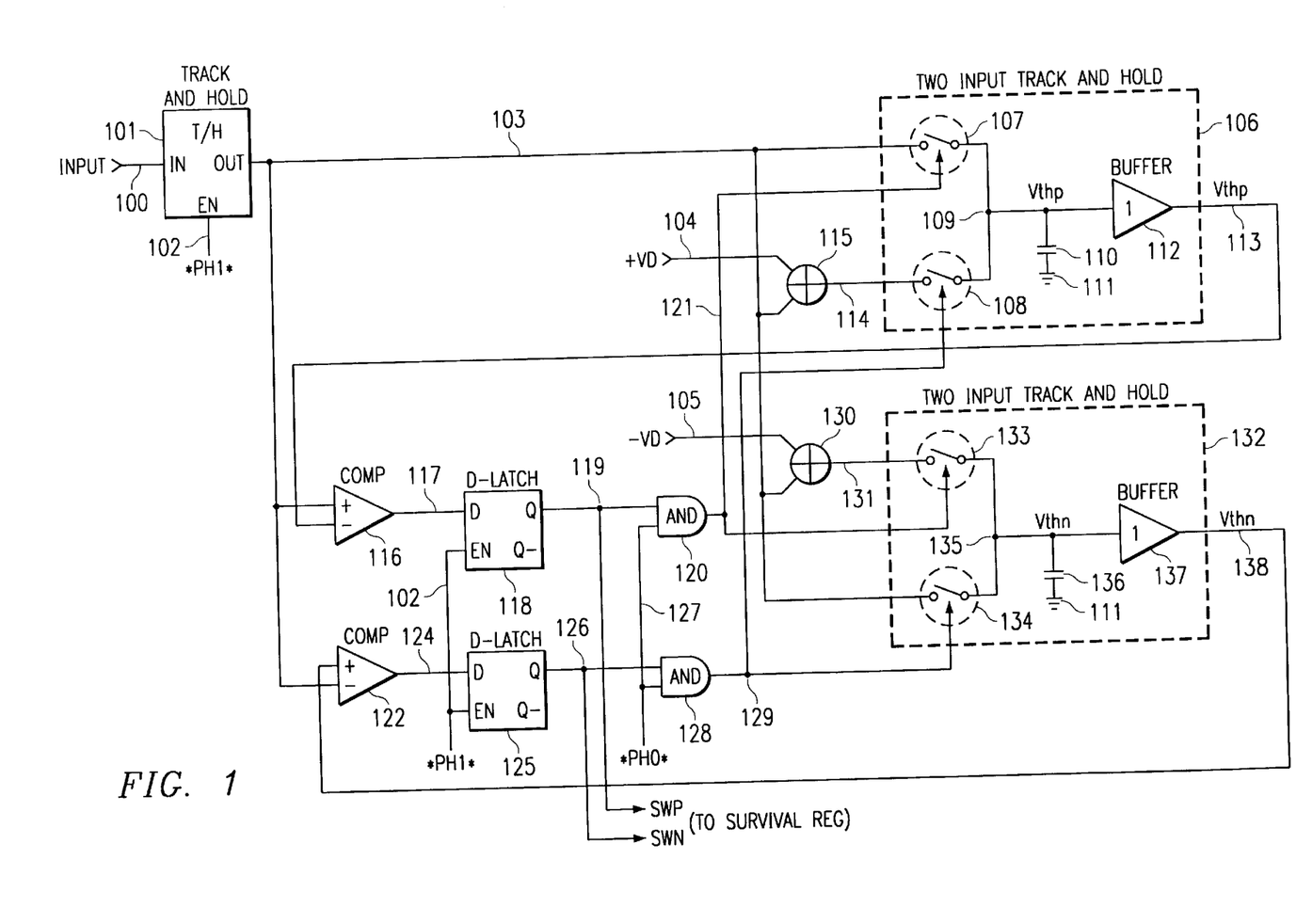
FIG. 1 is a circuit block diagram of the preferred embodiment of the sampled data Viterbi detector of the present invention.

FIG. 1 shows a circuit block diagram of a sampled data Viterbi detector for implementing the algorithm based upon equation (3). Analog input signal 100 is coupled into the input node of track and hold circuit 101. Output signal 103 from block 101 is provided to summing means 115 as well as summing means 130. In addition, signal 103 is coupled to switch 107 within two-input track and hold circuit 106, and switch 134 within two-input track and hold circuit 132. Positive reference voltage signal (+VD) 104 is provided to summing means 115, and negative reference voltage signal (-VD) 105 is provided to summing means 130. Summing output signal 114 is coupled to switch 108 within two-input track and hold circuit 106. Summing output signal 131 is coupled to switch 133 within two-input track and hold circuit 132.

Two-input track and hold circuit 106 is comprised of switches 107 and 108 coupled to holding capacitor 110 and buffer 112 via charge storage node 109. Buffer 112 provides positive threshold voltage signal (Vthp) 113. Holding capacitor 110 is coupled to ground node 111. It will be obvious to practitioners in the art that other track and hold (or sample and hold) architectures can be alternatively employed. For example, separate single-input track and hold circuits may be employed with an output selector switch appended.

Two-input track and hold circuit 132 is comprised of switches 133 and 134 coupled to holding capacitor 136 and buffer 137 via charge storage node 135. Buffer 137 provides negative threshold voltage signal (Vthn) 138. Holding capacitor 136 is also coupled to ground node 111.

Comparator 116 receives signal 103 at its positive input port and signal 113 at its negative input port, and provides comparator output 117 to D-latch 118. Comparator 122 receives signal 103 on its negative input port and signal 138 on its positive input port, and provides comparator output signal 124 to D-latch 125. Output signal 119 from D-latch 118 is coupled to AND gate 120 and is provided to a typical Viterbi survival sequence register (not shown) as signal SWP. Output signal 126 of D-latch 125 is coupled to AND gate 128, and is provided to a Viterbi survival sequence register as signal SWN. PH0 timing signal 127 is coupled to AND gates 120 and 128 to enable respective AND gate outputs 121 and 129. Signal 121 is coupled to switches 107 and 133 as a control signal. Signal 129 is coupled to switches 108 and 134 as a control signal. PH1 timing signal 102 is coupled to the enable (EN) ports of track and hold circuit 101 and D-latches 118 and 125.

The circuit of FIG. 1 is a two-phase system consisting of an update phase, phase zero, and an evaluate phase, phase one. In phase zero, timing signal PH0 127 is high and timing signal PH1 102 is low. In phase one, signal PH1 is high and signal PH0 is low. The circuit operates as follows.

At the initiation of phase zero, signal 102 is brought low by the system clock and signal 127 is brought high. This action disables the tracking of circuit 101, forcing signal 103 to maintain the same voltage value for the duration of the phase. Similarly, D-latches 118 and 125 are disabled from locking in new comparator results in this phase. However, threshold voltage updates are enabled during this phase. AND gates 120 and 128 are enabled by signal 127 thereby allowing the values latched into latches 118 and 125 on the previous phase to be transmitted from signals 119 and 126 to signals 121 and 129, respectively.

If signal 121 is low, switches 107 and 133 are open, disallowing signal 103 from directly transferring to holding node 109. Also, signal 131, the summed voltage of signal 103 and signal 105 (−VD), is disallowed from transferring to holding node 135. If signal 121 is high, switches 107 and 133 are closed, allowing signals 103 and 131 to charge or discharge nodes 109 and 135 as appropriate to track their respective voltage levels.

If signal 129 is low, switches 134 and 108 are open, disallowing signal 103 from directly transferring to holding node 135. Also, signal 114, the summed voltage of signal 103 and signal 104 (+VD), is disallowed from transferring to holding node 109. If signal 129 is high, switches 134 and 108 are closed, allowing signals 103 and 114 to charge or discharge nodes 135 and 109 as appropriate to track their respective voltage levels.

Signals 121 and 129 may be low at the same time, an indication that sample voltage 103 was between threshold values on the previous phase. In this case, switches 107, 108, 133 and 134 would all be open and nodes 109 and 135 would not be updated. This is consistent with the threshold update algorithm. There will never be a contention problem between signals 103 and 114 or between signals 103 and 131 because signals 121 and 129 are prohibited from being high at the same time in this configuration. Such a situation would indicate that signal 103 was simultaneously above the positive threshold and below the negative threshold at the conclusion of the previous phase.

Signals 113 and 138 track the voltage on nodes 109 and 135 at all times, therefore allowing comparators 116 and 122 to generate invalid outputs during this phase. However, while signal 102 is low, latches 118 and 125 are disabled and the invalid information is not propagated.

In phase one, signal 102 is brought high and signal 127 is brought low. Track and hold circuit 101 is enabled, allowing signal 103 to track the voltage level of input signal 100 throughout the phase. Because signal 127 is low, AND gates 120 and 128 are forced to output low signals on signals 121 and 129. All switches in track and hold circuits 106 and 132 are open, disabling tracking of their respective input signals. Therefore, voltage threshold signals (Vthp) 113 and (Vthn) 138 maintain the voltages established in the preceding phase zero.

Comparator 116 compares signal 103 with the currently static positive threshold signal 113 and outputs a high value on signal 117 if signal 103 is above the value of signal 113, ie. ($y_k$>Vthp$_k$). Otherwise, a low output is generated. D-latch 118 is enabled by signal 102 during this phase, updating its contents from signal 117 until the conclusion of the phase.

Comparator 122 compares signal 103 with the currently static negative threshold signal 138 and outputs a high value on signal 124 if signal 103 is below the value of signal 138, ie. ($y_k$<Vthn$_k$). Otherwise, a low output is generated. D-latch 125 is enabled by signal 102 during this phase, updating its contents from signal 124 until the conclusion of the phase.

The SWP signal 119 and SWN signal 126 are valid for use in the survival sequence register (not shown) during phase zero.

Figure 2:
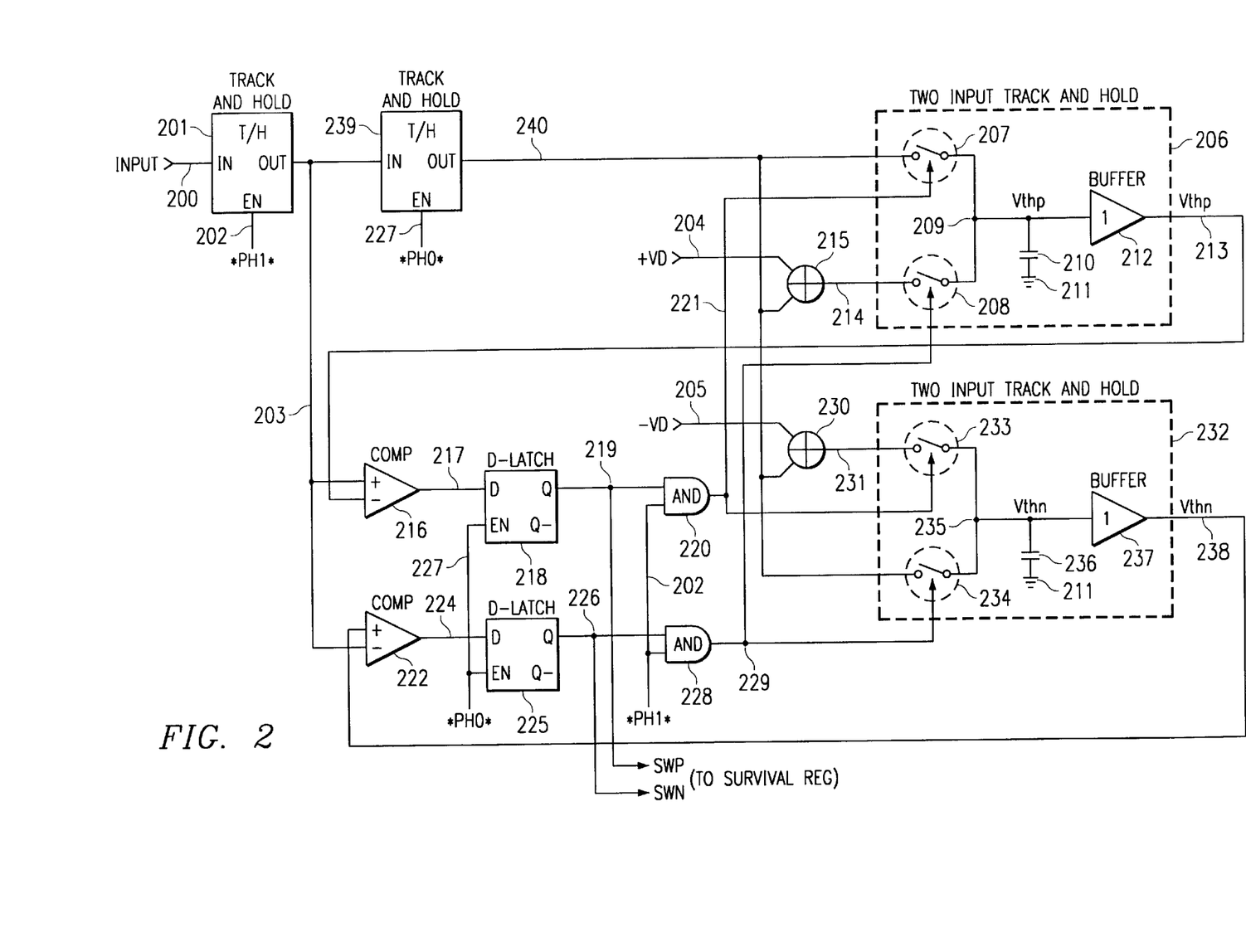
FIG. 2 is a circuit block diagram of a pipelined version of the preferred embodiment of the present invention.

FIG. 2 is a circuit block diagram of an alternate embodiment of the present invention. It comprises a pipelined version of the sample data Viterbi detector of FIG. 1 and offers the trade-off of slightly increased speed at the cost of an additional track and hold circuit. The primary difference between the circuit of FIG. 1 and that of FIG. 2 is the presence of track and hold circuit 239 in between the initial track and hold circuit 201 and the two-input track and hold circuits, 206 and 232, used for updating the threshold values, and the effect this extra circuit has on the circuit activity during each phase.

Analog input signal 200 is coupled to input port of track and hold circuit 201. Output signal 203 from track and hold circuit 201 is coupled to the input port of track and hold circuit 239, a positive input port of comparator 216 and the negative input port of comparator 222. Output signal 240 from track and hold circuit 239 is coupled to switch 207 within two-input track and hold circuit 206, and switch 234 within two-input track and hold circuit 232. Signal 240 is further provided to summing means 215 and summing 230. Positive voltage reference signal 204 is coupled to summing means 215, and negative voltage reference signal 205 is coupled to summing means 230. Summing output 214 from summing means 215 is coupled to switch 208 within two-input track and hold circuit 206. Summing output 231 from summing means 230 is provided to switch 233 within two-input track and hold circuit 232.

Two-input track and hold circuit 206 is comprised of switches 207 and 208 coupled to node 209, that is further coupled to holding capacitor 210 and buffer 212. Buffer 212 provides positive voltage threshold signal 213. Holding capacitor 210 is further coupled to ground node 211.

Two-input track and hold circuit 232 is comprised of switches 233 and 234 coupled to node 235, that is further coupled to holding capacitor 236 and buffer 237. Buffer 237 provides negative threshold voltage signal 238. Holding capacitor 236 is further coupled to ground node 211.

Positive threshold voltage signal 213 is coupled to the negative input port of comparator 216. Negative threshold voltage signal 238 is coupled to the positive input port of comparator 222. Comparator output 217 from comparator 216 and comparator output signal 224 from comparator 222 are provided to D-latches 218 and 225, respectively. Output signal 219 from D-latch 218 is coupled to AND gate 220 and to a Viterbi survival sequence register (not shown) as signal SWP. Output signal 226 from D-latch 225 is coupled to AND gate 228 and is provided to the Viterbi survival sequence register as signal SWN.

AND gate 220 provides signal 221 to switch 207 within two-input track and hold circuit 206 and switch 233 within two-input track and hold circuit 232 as a control signal. AND gate 228 provides signal 229 to switch 208 within two-input track and hold circuit 206 and switch 234 within two-input track and hold circuit 232 as a control voltage. PH1 timing signal 202 is coupled to AND gates 220 and 228, as well as the enable (EN) port of track and hold circuit 201. PHO timing signal 227 is coupled to the enable (EN) ports or track and hold circuit 239 and D-latches 218 and 225.

Components in FIG. 2 correspond to the components in FIG. 1 with identical second and third digits in the reference number (e.g. 200 is equivalent to 100, 201 is equivalent to 101, etc.). The only disparities are swapping of timing signals 202 and 207 in some blocks, the coupling of circuit 239 to signals 203 and 240, and the coupling of signal 240 instead of signal 203 to blocks 206, 215, 230 and 232. This pipelining affects the circuit operation in the following manner.

In the circuit of FIG. 2, phase one is the update phase. Track and hold circuit 201 is enabled to track input 200, thereby updating signal 203 ($y_k$). Also, AND gates 220 and 228 are enabled to pass signals 219 and 226 to circuits 206 and 232, respectively, for the purpose of updating the threshold values. Track and hold circuit 239 is disabled to provide a stable version of the previous $y_k$ to the update circuits. During this update process, the comparator outputs are invalid, so D-latches 218 and 225 are disabled.

In phase zero, the evaluate phase for FIG. 2, track and hold circuit 201 is disabled, providing a stable, buffered signal to comparators 216 and 222 for comparison with signals 213 and 238, respectively. This differs from the circuit of FIG. 1 in which the input signal 103 to the comparators is changing during the evaluation phase. AND gates 220 and 228 are disabled by signal 202, thus disabling threshold updates while track and hold circuit 239 updates signal 240 by tracking on signal 203. Latches 218 and 225 are permitted to latch in the results from the comparison of static signal 203 with static signals 213 and 238. The operating speed of the circuit of FIG. 2 is increased because all of the analog and digital samples in the system are buffered by either a track and hold circuit or a latch.

Figure 3:
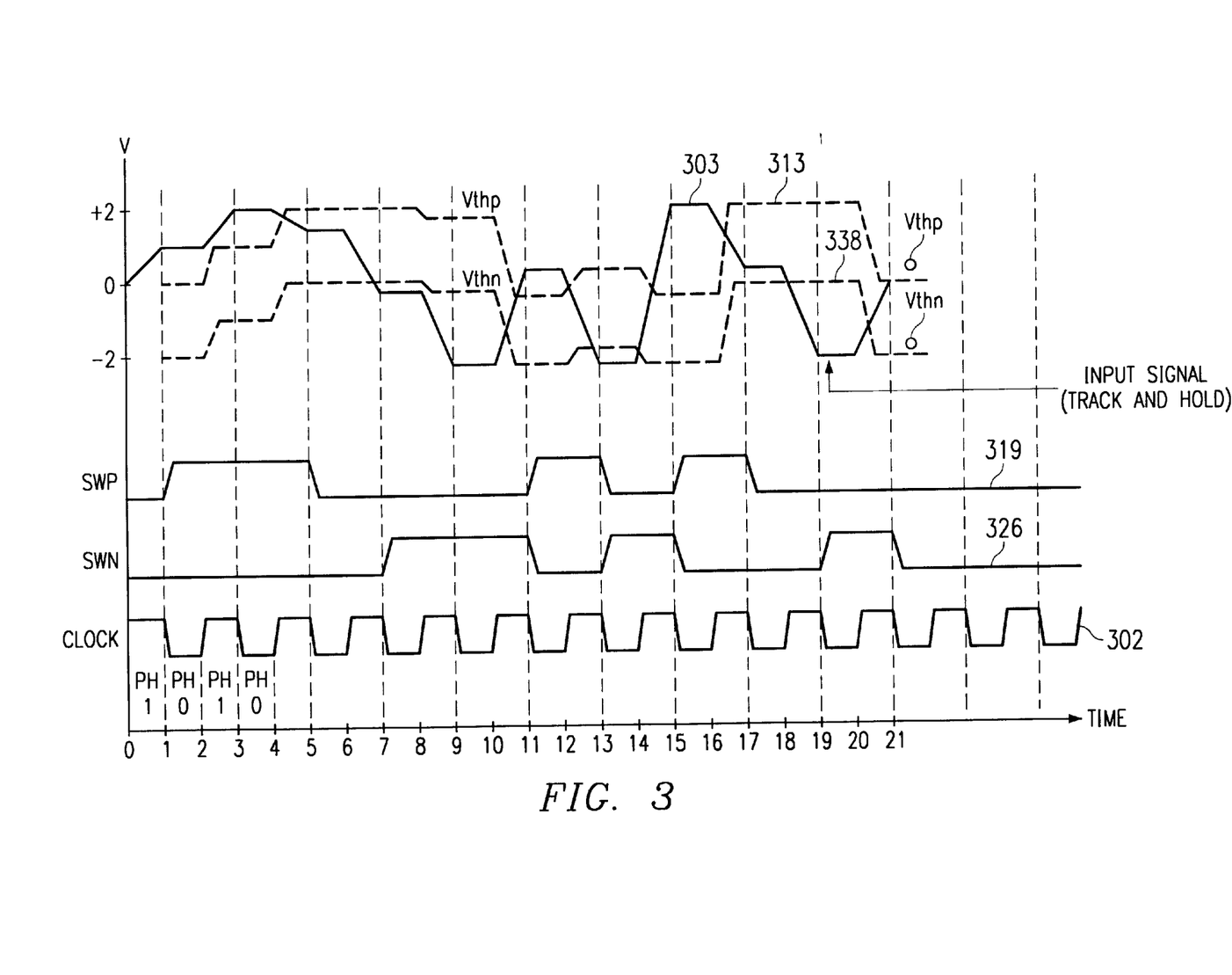
FIG. 3 is a timing diagram of the operation of the Viterbi detector illustrated in FIG. 2.

FIG. 3 is a timing diagram of the operation of the pipelined Viterbi detector of FIG. 2 utilizing an arbitrary waveform input. Track and hold input signal waveform 303 is representative of a possible voltage waveform from signal 203 of FIG. 2. Waveform Vthp 313 is representative of the associated positive threshold voltage signal 213. Waveform Vthn 338 is representative of the associated negative threshold voltage signal 238. SWP waveform 319 corresponds to signal 219 of FIG. 2, whereas SWN waveform 326 corresponds to signal 226.

Clock waveform 302 illustrates when timing signals PH1 and PH0 would be asserted on nodes 202 and 227 of FIG. 2, respectively. PH1 signal 202 is asserted when clock waveform 302 is in its "high" state. Signal 227 is asserted when clock waveform 302 is in its "low" state. With respect to the time scale of FIG. 3, PH1 is asserted on all even time intervals, whereas signal PH0 is asserted during all odd time intervals.

Waveforms 303, 313 and 338 all represent output signals of track and hold circuits wherein tracking is enabled when signal PH1 is asserted, i.e. on all even time intervals. During odd time intervals, these waveforms are maintained in a static voltage position. Waveforms SWP 319 and SWN 326 correspond to the latched outputs of comparator circuits. Waveform SWP 319 is latched on all odd time intervals, with its binary state determined by the position of waveform 303 relative to waveform 313. When waveform 303 is at a higher voltage than waveform 313, waveform SWP 319 is latched into a high state. Conversely, when waveform 303 is at a lower voltage relative to waveform 313, waveform SWP 319 is latched into a low state.

The binary state of waveform SWN 326 is determined by the relative voltage value of waveform 303 with respect to waveform 338. When waveform 303 is at a higher voltage level than wave form 338, waveform SWN 326 is latched into a low state. Conversely, when waveform 303 is at a lower voltage than waveform 338, waveform SWN 326 is latched into a high state.

While waveform 303 lies above waveform 313, during even time intervals, waveform 313 attempts to track the value waveform 303 had in the previous odd interval and waveform 338 attempts to track similarly, but with a voltage offset determined by −VD signal 205 in FIG. 2. While waveform 303 lies between waveforms 313 and 338, waveforms 313 and 338 remain at a constant level. When waveform 303 lies below waveform 338, during even time intervals, waveform 338 attempts to track the value waveform 303 had during the previous odd interval and waveform 313 attempts to track similarly, but with a voltage offset determined by +VD signal 204 in FIG. 2.

As shown in FIG. 3, Vthn always tracks at a level of (Vthp−2). Because the difference between $Vthp_k$ and $Vthn_k$ is always 2, it is possible to store only one threshold and derive the other from the single stored value. For example, if $Vthp_k$ is stored and $Vthn_k$ is derived by simply subtracting two from $Vthp_k$, equation (3) becomes $$Vthp_{k+1} = \qquad (4)$$

$$\{y_k + 2, \quad \text{if } y_k < Vthp_k - 2 \qquad (\text{"−" transition, "+" merge})$$

$$\{Vthp_k, \quad \text{if } Vthp_k - 2 < y_k < Vthp_k \quad (\text{no transition, no merge})$$

$$\{y_k, \qquad \text{if } y_k > Vthp_k \qquad (\text{"+" transition, "−" merge})$$

A similar relationship can be derived if $Vthn_k$ is stored and $Vthp_k$ is derived instead.

Figure 4:
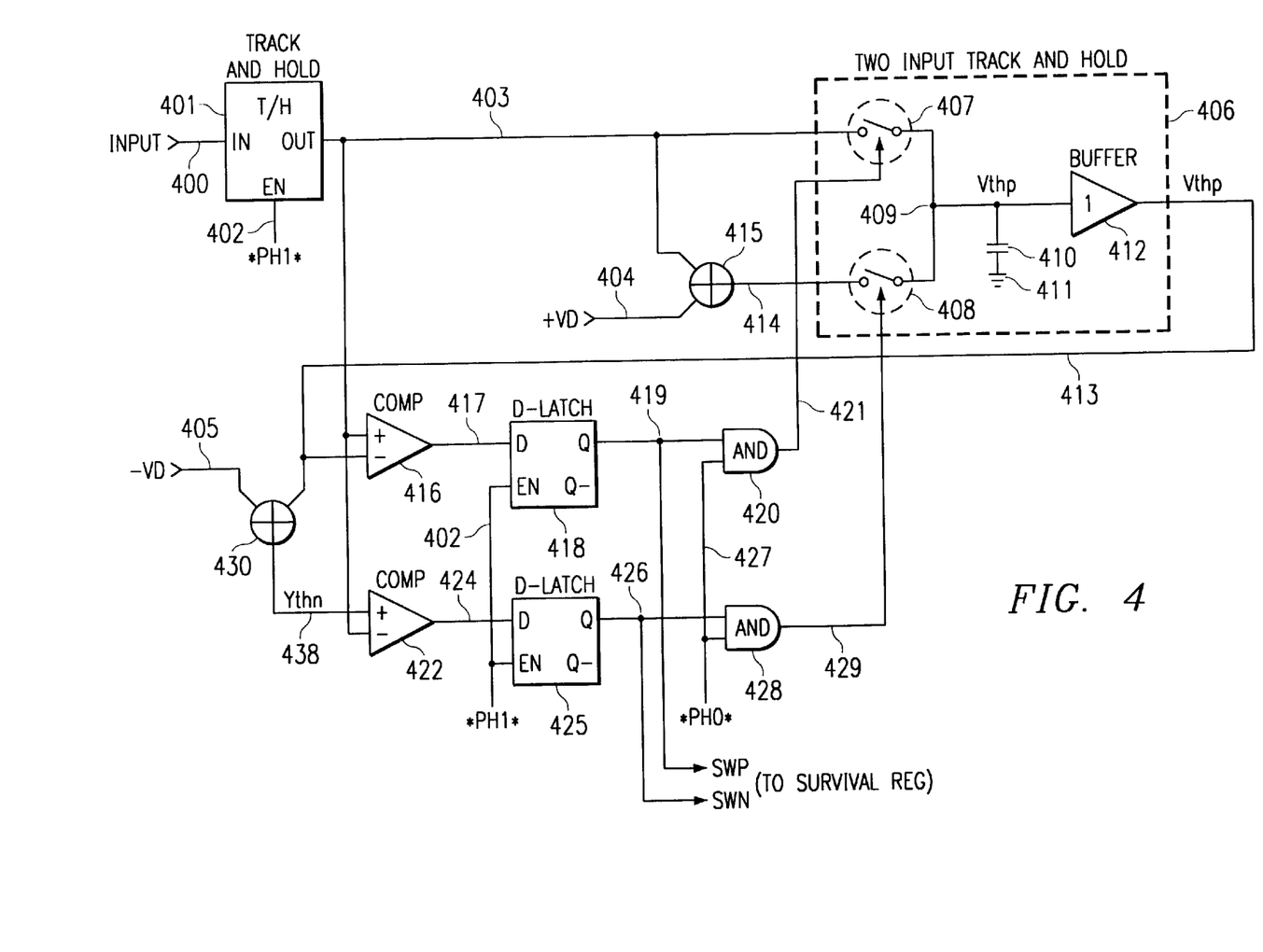
FIG. 4 is a circuit block diagram of a reduced hardware version of the preferred embodiment of the present invention.

FIG. 4 shows a circuit block diagram for a sample data Viterbi detector implementing equation (4). Analog input signal 400 is coupled to the input port of track and hold circuit 401. Track and hold circuit 401 provides output signal 403 to switch 407 in the two-input track and hold circuit 406 as well as summing means 415. The positive input port of comparator 416 and the negative input port of comparator 422 also are coupled to signal 403. Positive reference voltage signal 404 is provided to summing means 415. The output 414 of summing means 415 is provided to switch 408 within two-input track and hold circuits 406.

Two-input track and hold circuit 406 is comprised of switch 407 and switch 408 coupled to holding capacitor 410 and buffer 412 via node 409. Holding capacitor 410 is also coupled to ground node 411. Buffer 412 provides positive threshold voltage signal 413.

Positive threshold voltage signal 413 is provided to the negative input port of comparator 416 and to summing means 430. Negative voltage reference signal 405 is coupled to summing means 430, that produces negative threshold voltage signal 438. Negative threshold voltage signal 438 is coupled to the positive input port of comparator 422. Comparators 416 and 422 generate comparator output 417 and 424 respectively. Comparator outputs 417 and 424 are coupled to the input ports of D-latches 418 and 425, respectively. D-latch 418 provides latched output 419 to AND gate 420 and also to a Viterbi survival sequence register (not shown) as signal SWP. D-latch 425 provides latched output 426 to AND gate 428 and also to the Viterbi survival sequence register as signal SWN. AND gates 420 and 428 provide control signals 421 and 429 to switches 407 and 408, respectively. PH1 timing signal 402 is coupled to the enable (EN) ports of track and hold circuit 401 and D-latches 418 and 425. PH0 timing signal 427 is coupled to AND gates 420 and 428.

The operation of the circuit of FIG. 4 is similar to that of the circuit of FIG. 1 except for the generation of Vthn, signal 438 in FIG. 4. All elements in FIG. 4 correspond to similar elements in FIG. 1 with the relationship that element 400 corresponds to element 100, element 401 corresponds to element 101, etc. Two-input track and hold circuit 132 is not necessary in the implementation of FIG. 4.

Summing means 430 receive Vthp signal 413 rather than signal 403, and generates Vthn signal 438 directly by adding signal 413 with −VD signal 405. Therefore, summing means 430 are no longer in the update path, but lie directly in the evaluate path for SWN signal 426.

This alternate embodiment of the present invention utilizing the reduced algorithm has the advantage over the circuit of FIGS. 1 and 2 in that its hardware has been reduced by the equivalent of a two-input track and hold circuit. While reducing the hardware, this alteration also reduces the operational speed of the circuit because the derivation of the second threshold must take place in front of the comparing means during the evaluation phase of the circuit, thus increasing the amount of circuit delay in the critical path.

Figure 5:
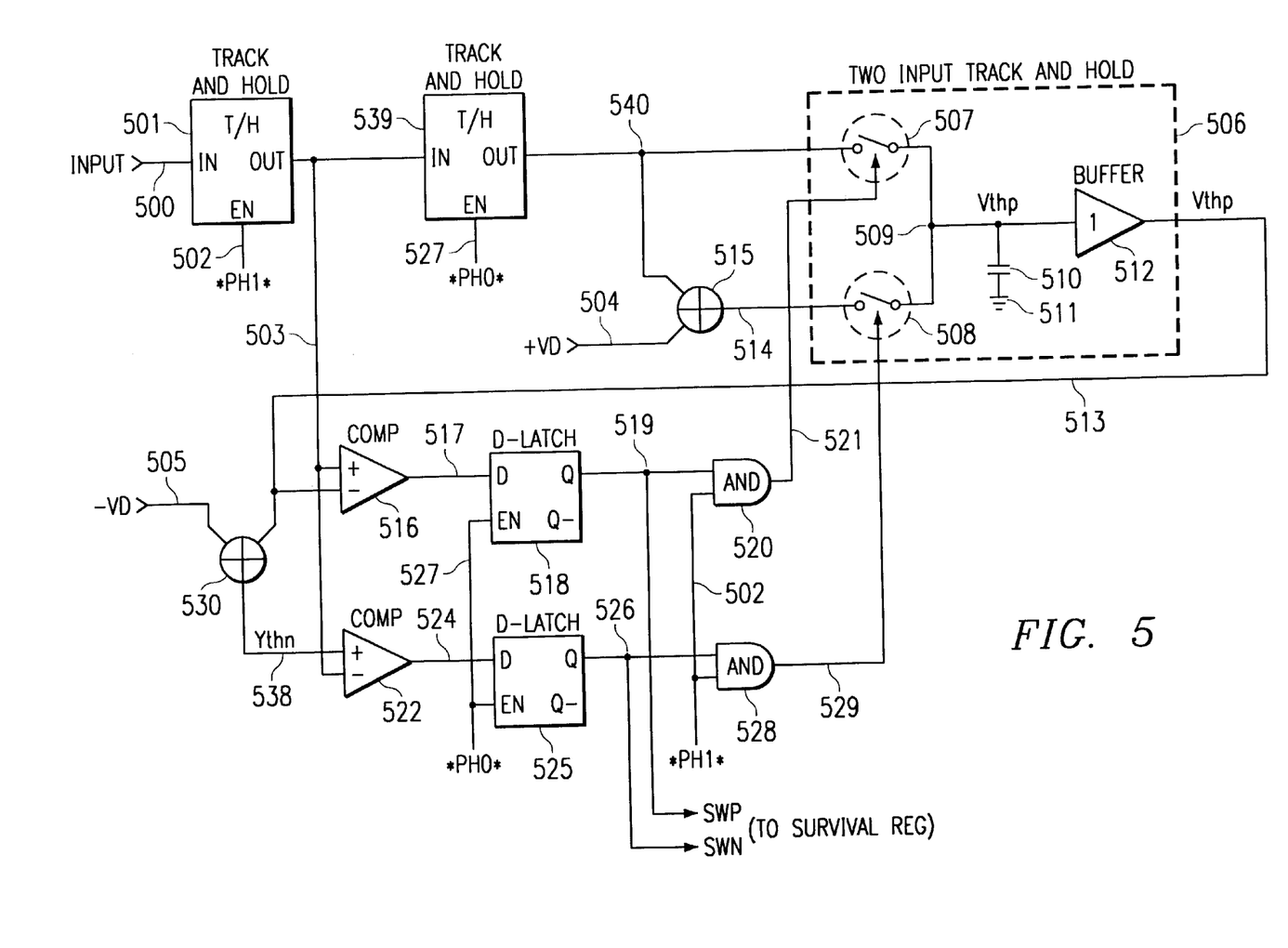
FIG. 5 is a circuit block diagram of a pipelined version of the circuit illustrated in FIG. 4.

FIG. 5 shows a circuit block diagram of a pipelined version of the sample data Viterbi Detector illustrated in FIG. 4. Input signal 500 is provided to track and hold circuit 501. Output signal 503 from track and hold circuit 501 is coupled to the input port of track and hold circuit 539 as well as the positive input port of comparator 516 and the negative input port of comparator 522. Output signal 540 from track and hold circuit 539 is coupled to switch 507 within two-input track and hold circuit 506, and summing means 515. Positive voltage reference signal 504 is coupled to summing mean 515. Summed output 514 from summing means 515 is provided to switch 508 within two-input track and hold circuit 506.

Two-input track and hold circuit 506 is comprised of switches 507 and 508 coupled to holding capacitor 510 and buffer 512 via node 509. Holding capacitor 510 is further coupled to ground node 511.

Buffer 512 provides positive threshold voltage signal 513 to summing means 530 and the negative input port of comparator 516. Summing means 530 receives negative voltage reference signal 505 and produces negative threshold voltage signal 538 that is coupled to the positive input port of comparator 522. Comparator 516 provides signal 517 to the input of D-latch 518. Comparator 522 provides signal 524 to the input of D-latch 525. D-latches 518 and 525 provide latched output signals 519 and 526 to AND gates 520 and 528 respectively. Signal 519 is coupled to a Viterbi survival sequence register (not shown) as signal SWP. Signal 526 is coupled to the Viterbi survival sequence register as signal SWN. The output of AND gates 520 and 528 are provided as control signals to switches 507 and 508 respectively.

PH1 timing signal 502 is coupled to AND gates 520 and 528, as well as to the enable (EN) port of track and hold circuit 501. PH0 timing signal 527 is coupled to the enable (EN) ports of track and hold circuit 539 and D-latches 518 and 525.

The circuit of FIG. 5 has the same advantage over the embodiment in FIG. 4 that the circuit of FIG. 2 had over that of FIG. 1. The operational phases are altered equivalently as well. All analog and digital samples are buffered by track and hold circuits or latches. The operational speed of the circuit is therefore increased with respect to the circuit of FIG. 4. The hardware complexity is less than that of the embodiments in FIGS. 1 and 2 because of the lack of a two-input track and hold circuit for storing a second threshold. This is an advantage with respect to area, power dissipation and cost considerations. However, the speed is still less than that obtainable by the embodiments in FIGS. 1 and 2 by virtue of the summing means being placed in the critical path. Each of the circuits in FIGS. 1, 2, 4 and 5 represent a possible embodiment of the present invention, providing a superior analog solution to the costly and overly complex prior art systems.

Thus, a new method and apparatus for implementing a Viterbi detector in a PRML channel has been described.

We claim:

1. An apparatus for performing Viterbi detection comprising:

first sampling means receiving an input signal and a timing signal, said first sampling means generating a sampled signal;

comparing means coupled to said first sampling means, said comparing means receiving first and second threshold signals and said sampled signal, said comparing means generating first and second output signals in accordance with said timing signal;

updating means coupled to said first sampling means and said comparing means, said updating means receiving said timing signal, said first and second output signals and said sampled signal, said updating means providing said first and second threshold signals, wherein said updating means comprises first summing means for receiving said sampled signal; and a clock generator providing said timing signal;

wherein said updating means comprise:

said first summing means receiving said sampled signal and a first reference signal, said first summing means providing a first summed signal;

second summing means receiving said sampled signal and a second reference signal, said second summing means providing a second summed signal;

first two-input sampling means receiving said sampled signal, said first summed signal, said timing signal and said first and second output signals, said first two-input sampling means providing said first threshold signal; and second two-input sampling means receiving said sampled signal, said second summed signal, said timing signal and said first and second output signals, said second two-input sampling means providing said second threshold signal.

2. The apparatus of claim wherein at least one of said first and second two-input sampling means comprise:

enabling means receiving said first and second output signals and said timing signal, said enabling means providing first and second control signals;

switching means receiving one of said first and second summed signals, said sampled signal, and said first and second control signals;

storage means coupled to said switching means, said storage means providing one of said first and second threshold signals.

3. The apparatus of claim 1 wherein at least one of said first and second two-input sampling means comprise:

second sampling means receiving said sampled signal and said timing signal;

third sampling means receiving said timing signal and one of said first and second summed signals;

switching means coupled to said second and third sampling means, said switching means receiving said first and second output signals and providing one of said first and second threshold signals.

4. An apparatus for performing Viterbi detection comprising:

first sampling means receiving an input signal and a timing signal, said first sampling means generating a sampled signal;

comparing means coupled to said first sampling means, said comparing means receiving first and second threshold signals and said sampled signal, said comparing means generating first and second output signals in accordance with said timing signal;

updating means coupled to said first sampling means and said comparing means, said updating means receiving said timing signal, said first and second output signals and said sampled signal, said updating means providing said first and second threshold signals, wherein said updating means comprises first summing means for receiving said sampled signal; and a clock generator providing said timing signal;

wherein said updating means comprise:

first summing means receiving said sampled signal and a first reference signal, said first summing means providing a summed signal;

two-input sampling means receiving said summed signal, said sampled signal, said timing signal and said first and second output signals; said two-input sampling means providing said first threshold signal;

second summing means receiving said first threshold signal and a second reference signal, said second summing means providing said second threshold signal.

5. The apparatus of claim 4 herein said two-input sampling means comprise:

enabling means receiving said first and second output signals and said timing signal, said enabling means providing first and second control signals;

switching means receiving said summed signal, said sampled signal, and said first and second control signals;

storage means coupled to said switching means, said storage means providing said first threshold signal.

6. The apparatus of claim 4 wherein said two-input sampling means comprise:

second sampling means receiving said sampled signal and said timing signal;

third sampling means receiving said timing signal and said summed signal;

switching means coupled to said second and third sampling means, said switching means receiving said first and second output signals and providing said first threshold signal.

7. An apparatus for performing Viterbi detection comprising:

first sampling means receiving an input signal and a timing signal, said first sampling means generating a sampled signal;

comparing means coupled to said first sampling means, said comparing means receiving first and second threshold signals and said sampled signal, said comparing means generating first and second output signals in accordance with said timing signal;

updating means coupled to said first sampling means and said comparing means, said updating means receiving said timing signal, said first and second output signals and said sampled signal, said updating means providing said first and second threshold signals, wherein said updating means comprises first summing means for receiving said sampled signal; and a clock generator providing said timing signal;

wherein said comparing means comprise:

a first comparator receiving said sampled signal and said first threshold signal;

first latching means coupled to said first comparator, said first latching means receiving said timing signal and providing said first output signal;

a second comparator receiving said sampled signal and said second threshold signal; and second latching means coupled to said second comparator, said second latching means receiving said timing signal and providing said second output signal.

8. An apparatus for performing Viterbi detection comprising:

first sampling means receiving an input signal and a timing signal, said first sampling means generating a first sampled signal;

comparing means coupled to said first sampling means, said comparing means receiving first and second threshold signals and said first sampled signal, said comparing means generating first and second output signals in accordance with said timing signal;

second sampling means coupled to said first sampling means, said second sampling means providing a second sampled signal;

updating means coupled to said second sampling means and said comparing means, said updating means receiving said timing signal, said first and second output signals and said second sampled signal, said updating means providing said first and second threshold signals; and a clock generator providing said timing signal;

wherein said updating means comprise:

first summing means receiving said second sampled signal and a first reference signal, said first summing means providing a first summed signal;

second summing means receiving said second sampled signal and a second reference signal, said second summing means providing a second summed signal;

first two-input sampling means receiving said second sampled signal, said first summed signal, said timing signal and said first and second output signals, said first two-input sampling means providing said first threshold signal;

second two-input sampling means receiving said second sampled signal, said second summed signal, said timing signal and said first and second output signals, said second two-input sampling means providing said second threshold signal.

9. The apparatus of claim 8 wherein at least one of said first and second two-input sampling means comprise:

enabling means receiving said first and second output signals and said timing signal, said enabling means providing first and second control signals;

switching means receiving one of said summed signals, said second sampled signal, and said first and second control signals;

storage means coupled to said switching means, said storage means providing one of said first and second threshold signals.

10. The apparatus of claim 8 wherein at least one of said first and second two-input sampling means comprise:

third sampling means receiving said second sampled signal and said timing signal;

fourth sampling means receiving said timing signal and one of said first and second summed signals;

switching means coupled to said third and fourth sampling means, said switching means receiving said first and second output signals and providing one of said first and second threshold signals.

11. An apparatus for performing Viterbi detection comprising:

first sampling means receiving an input signal and a timing signal, said sampling means generating a first sampled signal;

comparing means coupled to said first sampling means, said comparing means receiving first and second threshold signals and said first sampled signal, said comparing means generating first and second output signals in accordance with said timing signal;

second sampling means coupled to said first sampling means, said second sampling means providing a second sampled signal;

updating means coupled to said second sampling means and said comparing means, said updating means receiving said timing signal, said first and second output signals and said second sampled signal, said updating means providing said first and second threshold signals; and a clock generator providing said timing signal;

wherein said updating means comprise:

first summing means receiving said second sampled signal and a first reference signal, said first summing means providing a summed signal;

two-input sampling means receiving said summed signal, said second sampled signal, said timing signal and said first and second output signals, said two-input sampling means providing said first threshold signal;

second summing means receiving said first threshold signal and a second reference signal, said second summing means providing said second threshold signal.

12. The apparatus of claim 11 wherein said two-input sampling means comprise:

enabling means receiving said first and second output signals and said timing signal, said enabling means providing first and second control signals;

switching means receiving said summed signal, said second sampled signal, and said first and second control signals;

storage means coupled to said switching means, said storage means providing said first threshold signal.

13. The apparatus of claim 11 wherein said two-input sampling means comprise:

third sampling means receiving said second sampled signal and said timing signal;

fourth sampling means receiving said timing signal and said summed signal;

switching means coupled to said third and fourth sampling means, said switching means receiving said first and second output signals and providing said first threshold signal.

14. An apparatus for performing Viterbi detection comprising:

first sampling means receiving an input signal and a timing signal, said sampling means generating a first sampled signal;

comparing means coupled to said first sampling means, said comparing means receiving first and second threshold signals and said first sampled signal, said comparing means generating first and second output signals in accordance with said timing signal;

second sampling means coupled to said first sampling means, said second sampling means providing a second sampled signal;

updating means coupled to said second sampling means and said comparing means, said updating means receiving said timing signal, said first and second output signals and said second sampled signal, said updating means providing said first and second threshold signals; and a clock generator providing said timing signal;

wherein said comparing means comprise:

a first comparator receiving said first sampled signal and said first threshold signal;

first latching means coupled to said first comparator, said first latching means receiving said timing signal and providing said first output signal;

a second comparator receiving said first sampled signal and said second threshold signal; and second latching means coupled to said second comparator, said second latching means receiving said timing signal and providing said second output signal.

15. An apparatus for performing Viterbi detection comprising:

first sampling means receiving an input signal and a timing signal, said first sampling means generating a sampled signal;

comparing means coupled to said first sampling means, said comparing means receiving first and second threshold signals and said sampled signal, said comparing means generating first and second output signals in accordance with said timing signal;

updating means coupled to said first sampling means and said comparing means, said updating means receiving said timing signal, said first and second output signals and said sampled signal, said updating means providing said first and second threshold signals;

a clock generator providing said timing signal;

wherein said updating means comprise:

first summing means receiving said sampled signal and a first reference signal, said first summing means providing a first summed signal;

second summing means receiving said sampled signal and a second reference signal, said second summing means providing a second summed signal;

first two-input sampling means receiving said sampled signal, said first summed signal, said timing signal and said first and second output signals, said first two-input sampling means providing said first threshold signal;

second two-input sampling means receiving said sampled signal, said second summed signal, said timing signal and said first and second output signals, said second two-input sampling means providing said second threshold signal.

16. The apparatus of claim 15 wherein at least one of said first and second two-input sampling means comprise:

enabling means receiving said first and second output signals and said timing signal, said enabling means providing first and second control signals;

switching means receiving one of said first and second summed signals, said sampled signal, and said first and second control signals;

storage means coupled to said switching means, said storage means providing one of said first and second threshold signals.

17. The apparatus of claim 15 wherein at least one of said first and second two-input sampling means comprise:

second sampling means receiving said sampled signal and said timing signal;

third sampling means receiving said timing signal and one of said first and second summed signals;

switching means coupled to said second and third sampling means, said switching means receiving said first and second output signals and providing one of said first and second threshold signals.

18. An apparatus for performing Viterbi detection comprising:

first sampling means receiving an input signal and a timing signal, said first sampling means generating a sampled signal;

comparing means coupled to said first sampling means, said comparing means receiving first and second threshold signals and said sampled signal, said comparing means generating first and second output signals in accordance with said timing signal;

updating means coupled to said first sampling means and said comparing means, said updating means receiving said timing signal, said first and second output signals and said sampled signal, said updating means providing said first and second threshold signals;

a clock generator providing said timing signal;

wherein said updating means comprise:

first summing means receiving said sampled signal and a first reference signal, said first summing means providing a summed signal;

two-input sampling means receiving said summed signal, said sampled signal, said timing signal and said first and second output signals, said two-input sampling means providing said first threshold signal;

second summing means receiving said first threshold signal and a second reference signal, said second summing means providing said second threshold signal.

19. The apparatus of claim 18 wherein said two-input sampling means comprise:

enabling means receiving said first and second output signals and said timing signal, said enabling means providing first and second control signals;

switching means receiving said summed signal, said sampled signal, and said first and second control signals;

storage means coupled to said switching means, said storage means providing said first threshold signal.

20. The apparatus of claim 18 wherein said two-input sampling means comprise:

second sampling means receiving said sampled signal and said timing signal;

third sampling means receiving said timing signal and said summed signal;

switching means coupled to said second and third sampling means, said switching means receiving said first and second output signals and providing said first threshold signal.

21. An apparatus for performing Viterbi detection comprising:

first sampling means receiving an input signal and a timing signal, said first sampling means generating a sampled signal;

comparing means coupled to said first sampling means, said comparing means receiving first and second threshold signals and said sampled signal, said comparing means generating first and second output signals in accordance with said timing signal;

updating means coupled to said first sampling means and said comparing means, said updating means receiving said timing signal, said first and second output signals and said sampled signal, said updating means providing said first and second threshold signals;

a clock generator providing said timing signal;

wherein said comparing means comprise:

first comparator receiving said sampled signal and said first threshold signal;

first latching means coupled to said first comparator, said first latching means receiving said timing signal and providing said first output signal;

second comparator receiving said sampled signal and said second threshold signal;

second latching means coupled to said second comparator, said second latching means receiving said timing signal and providing said second output signal.

22. An apparatus for performing Viterbi detection comprising:

first sampling means receiving an input signal and a timing signal, said sampling means generating a first sampled signal;

comparing means coupled to said first sampling means, said comparing means receiving first and second threshold signals and said first sampled signal, said comparing means generating first and second output signals in accordance with said timing signal;

second sampling means coupled to said first sampling means, said second sampling means providing a second sampled signal;

updating means coupled to said second sampling means and said comparing means, said updating means receiving said timing signal, said first and second output signals and said second sampled signal, said updating means providing said first and second threshold signals;

a clock generator providing said timing signal;

wherein said updating means comprise:

first summing means receiving said second sampled signal and a first reference signal, said first summing means providing a first summed signal;

second summing means receiving said second sampled signal and a second reference signal, said second summing means providing a second summed signal;

first two-input sampling means receiving said second sampled signal, said first summed signal, said timing signal and said first and second output signals, said first two-input sampling means providing said first threshold signal;

second two-input sampling means receiving said second sampled signal, said second summed signal, said timing signal and said first and second output signals, said second two-input sampling means providing said second threshold signal.

23. The apparatus of claim 22 wherein at least one of said first and second sampling means comprise an analog track and hold circuit.

24. The apparatus of claim 22 wherein at least one of said first and second two-input sampling means comprise:

enabling means receiving said first and second output signals and said timing signal, said enabling means providing first and second control signals;

switching means receiving one of said summed signals, said second sampled signal, and said first and second control signals;

storage means coupled to said switching means, said storage means providing one of said first and second threshold signals.

25. The apparatus of claim 22 wherein at least one of said first and second two-input sampling means comprise:

third sampling means receiving said second sampled signal and said timing signal;

fourth sampling means receiving said timing signal and one of said first and second summed signals;

switching means coupled to said third and fourth sampling means, said switching means receiving said first and second output signals and providing one of said first and second threshold signals.

26. An apparatus for performing Viterbi detection comprising:

first sampling means receiving an input signal and a timing signal, said sampling means generating a first sampled signal;

comparing means coupled to said first sampling means, said comparing means receiving first and second threshold signals and said first sampled signal, said comparing means generating first and second output signals in accordance with said timing signal;

second sampling means coupled to said first sampling means, said second sampling means providing a second sampled signal;

updating means coupled to said second sampling means and said comparing means, said updating means receiving said timing signal, said first and second output signals and said second sampled signal, said updating means providing said first and second threshold signals;

a clock generator providing said timing signal;

wherein said updating means comprise:

first summing means receiving said second sampled signal and a first reference signal, said first summing means providing a summed signal;

two-input sampling means receiving said summed signal, said second sampled signal, said timing signal and said first and second output signals, said two-input sampling means providing said first threshold signal;

second summing means receiving said first threshold signal and a second reference signal, said second summing means providing said second threshold signal.

27. The apparatus of claim 26 wherein at least one of said first and second sampling means comprise an analog track and hold circuit.

28. The apparatus of claim 26 wherein said two-input sampling means comprise:

enabling means receiving said first and second output signals and said timing signal, said enabling means providing first and second control signals;

switching means receiving said summed signal, said second sampled signal, and said first and second control signals;

storage means coupled to said switching means, said storage means providing said first threshold signal.

29. The apparatus of claim 26 wherein said two-input sampling means comprise:

third sampling means receiving said second sampled signal and said timing signal;

fourth sampling means receiving said timing signal and said summed signal;

switching means coupled to said third and fourth sampling means, said switching means receiving said first and second output signals and providing said first threshold signal.

30. An apparatus for performing Viterbi detection comprising:

first sampling means receiving an input signal and a timing signal, said sampling means generating a first sampled signal;

comparing means coupled to said first sampling means, said comparing means receiving first and second threshold signals and said first sampled signal, said comparing means generating first and second output signals in accordance with said timing signal;

second sampling means coupled to said first sampling means, said second sampling means providing a second sampled signal;

updating means coupled to said second sampling means and said comparing means, said updating means receiving said timing signal, said first and second output signals and said second sampled signal, said updating means providing said first and second threshold signals;

a clock generator providing said timing signal;

wherein said comparing means comprise:

first comparator receiving said first sampled signal and said first threshold signal;

first latching means coupled to said first comparator, said first latching means receiving said timing signal and providing said first output signal;

second comparator receiving said first sampled signal and said second threshold signal;

second latching means coupled to said second comparator, said second latching means receiving said timing signal and providing said second output signal.

31. The apparatus of claim wherein at least one of said first and second sampling means comprise an analog track and hold circuit.

* * * * *